(12) United States Patent
Millard

(10) Patent No.: US 6,237,246 B1
(45) Date of Patent: May 29, 2001

(54) TREATING SEWAGE OR LIKE SLUDGE

(75) Inventor: Robin Millard, Greenways (GB)

(73) Assignee: R3 Management Limited (GB)

( * ) Notice: Subject to any disclaimer, the term of this patent is extended or adjusted under 35 U.S.C. 154(b) by 0 days.

(21) Appl. No.: 09/331,964

(22) PCT Filed: Dec. 24, 1997

(86) PCT No.: PCT/GB97/03540

§ 371 Date: Jun. 29, 1999

§ 102(e) Date: Jun. 29, 1999

(87) PCT Pub. No.: WO98/29348

PCT Pub. Date: Jul. 9, 1998

(30) Foreign Application Priority Data

Jan. 2, 1997 (GB) .................................................. 9700015

(51) Int. Cl.[7] .................................................. F26B 3/00
(52) U.S. Cl. .................. 34/343; 34/379; 34/386; 34/389; 210/609; 210/770; 73/427; 73/428; 71/64.08
(58) Field of Search .............................. 34/343, 381, 386, 34/389, 379; 210/609, 710, 770, 787, 175, 180; 71/12, 13, 14, 15, 64.08; 73/426, 427, 428

(56) References Cited

U.S. PATENT DOCUMENTS

| | | | |
|---|---|---|---|
| 4,872,998 | * 10/1989 | Dausman et al. | 210/710 |
| 5,279,637 | * 1/1994 | Lynam et al. | 71/12 |
| 5,547,486 | * 8/1996 | Detrick et al. | 71/28 |
| 5,557,873 | * 9/1996 | Lynam et al. | 34/379 |
| 5,679,262 | * 10/1997 | Girovich et al. | 210/751 |
| 5,853,590 | * 12/1998 | Burnham | 210/609 |
| 6,079,122 | * 6/2000 | Rajkovich | 34/574 |

* cited by examiner

Primary Examiner—Pamela Wilson
(74) Attorney, Agent, or Firm—Charles D. Gunter, Jr.

(57) ABSTRACT

There is disclosed a process for treating sewage sludge or similar organic sludge in which dewatered sludge cake and an alkaline admixture are mixed and then dried under pasteurization conditions utilizing heat from the exothermic reaction with the alkali, in which drying is effected by extraction of moisture evaporated from the mixture by the exothermic heat.

35 Claims, 4 Drawing Sheets

TREATING SEWAGE OR LIKE SLUDGE

This invention relates to treating sewage sludge or similar organic sludge, such as that obtained from industrial sites such as waste water treatment plants.

EP 0 283 153 B1 discloses a method of treating wastewater sludge to provide a fertiliser for agricultural lands which can be applied directly to the land. The method involves mixing the sludge with alkaline material of specified fineness to raise the pH of the mixture to at least 12 for at least a day and to effect pasteurisation, and then drying the mixture. Drying is done either a) by aeration and maintaining the pH above 12 for at least seven days until the solids levels reach and maintain a minimum of 65% bulk solids, or b) by aeration and heating to a temperature of at least 50° C. and so that the solids levels reach and maintain a minimum of 50% solids. In b) the temperature should not be so high as to destroy all non-pathogenic organisms. The elevation of the pH and the drying are effected so as to reduce odour and undesirable viruses, bacteria, parasites and vector (e.g. flies) attraction to the sludge and prevent significant pathogen regrowth while not eliminating beneficial non-pathogenic microorganisms. At least some of the temperature rise is due to the exothermic reaction with the alkali. The product is allowed to air cure for about 10 days after achieving the desired solids content. Drying and curing may be effected by windrowing, turn-over or other forced air methods, and curing or aeration time is dependent on the aeration procedure and other factors and clearly need to be determined, for any particular circumstances, experimentally to see that the required end point has been reached. This involves taking samples to measure the solids content, testing for:

animal viruses—less than one plaque forming unit per 100 ml salmonella bacteria—less than three colony forming units per 100 ml parasites—less than one viable egg per 100 ml significant regrowth of the pathogenic microorganisms—there should be none and assessing the reduction of odour to a level tolerable in a closed room and that this reduction is maintained indefinitely under any climatic conditions, and whether flies are less attracted to the product. At the same time, the presence of at least some beneficial non-pathogenic microorganisms must be established.

If method b) is used, the minimum recommended time for maintaining the temperature at at least 50° C. (but not so high as to destroy all non-pathogenic microorganisms) is at least 12 hours and the heat treated alkaline stabilised dewatered sludge cake is then air dried (while the pH remains above 12 for at least 3 days) through intermittent turning of windrows until a minimum of 50% solids content is achieved.

GB 2 276 876 A, which refers to EP 0 283 153, describes treatment of sewage sludge having a solids content of at least 15% by weight with an alkaline material containing free lime, and storing and/or drying and/or composting the resultant mixture, adding sufficient lime to the mixture to achieve a pH of at least 10. Higher pH values, even higher than 12, are not ruled out, but it is suggested that excellent reduction in pathogens can be achieved at pH levels below 12 with reduced evolution of ammonia, which renders the treated sludge and its surroundings less unpleasant and means that the treated material retains more nitrogen increasing its value as a fertiliser.

The method of GB 2 276 876 involves dewatering the sludge, e.g. in a press, and measuring it using a weigh hopper into a mixer into which is delivered alkaline material in the appropriate amount, the mixed material being delivered to a skip to deliver it to a windrowing area where it is turned periodically, normally for a period up to seven days. However, it is suggested also that provided the amount of calcium oxide that has been introduced is sufficient to raise the pH to a value greater than 12, and sufficient, indeed, to ensure that it stays above 12 for at least 2 hours, then it is possible to store the mix for not less than two hours, but then apply it directly to the land.

It is apparent that the methods described in these two specifications are labour intensive and to a large extent dependent upon a subjective judgement (the assessment of odour in a closed room, for example) or upon results of biological tests which themselves could take days or weeks before you have a result.

It is necessary, for effective treatment, to mix the alkali with dewatered sludge, but sludge, nonetheless that comprises a substantial quantity of water, as it is only in the presence of water that the desired exothermic chemical reaction takes place. The end product—as is clear from the specification discussed—is required to have less water content than is appropriate during the heat-development stage. It is an essential part of the process, then, that the product be eventually dried, and this is the reason for treating it by windrowing. Windrowing, especially aeration by turning over windrows, is not only labour intensive and floor space intensive, it is a slow method of drying.

The present invention provides processes and apparatus for treating sewage sludge or similar organic sludge which are more efficient, less labour and space intensive, and more controllable (so as not to depend upon the results of biotechnological testing and measurement procedures) than prior art processes to date.

The invention comprises a process for treating sewage sludge or similar organic sludge in which dewatered sludge cake and an alkaline admixture are mixed and then dried under pasteurisation conditions utilising heat from the exothermic reaction with the alkali, in which drying is effected by extraction of moisture evaporated from the mixture by the exothermic heat.

The drying may be effected in a first in first out (FIFO) hopper.

Drying may be effected in a cycling operation until a predetermined moisture content is detected, then the dried material is discharged.

The drying may be effected to dry the product to between 50 and 65%, preferably between 55 and 60% dry solids content. The drying product may pass two or more times through a drying hopper. Drying may be assisted by an air flow, which may be fan generated. Gases given off during drying may be passed through an ammonia scrubber.

The dried material may be tested for moisture (or dry solids content) by a sensor the output of which determines whether the product is recycled or delivered to another location, e.g. a stockpile. The dried mixture may be tested by an infra-red moisture measuring transducer.

At the beginning of the process, the dewatered sludge may be measured for water content and the measure used to control the alkaline admixture—the dewatered sludge may pass beneath an infra-red moisture measuring transducer.

The dewatered sludge cake may be fed to a storage bin from where it is delivered to a mixing arrangement with the alkaline admixture. The storage bin may have a level sensor controlling the supply of sludge cake to the storage bin and/or delivery of sludge cake to the mixing arrangement.

The delivery of sludge cake to the mixing arrangement may be measured and the measurement used to control the supply of alkaline admixture to the mixing arrangement. Delivery of sludge cake to the mixing arrangement may be effected by a weigh belt.

The moisture content of the mixed dewatered sludge cake and alkaline admixture may be measured and the measurement may be used to control the addition of said admixture to said sludge cake.

The moisture content of the mixed dewatered sludge cake and alkaline admixture may be measured before drying and the measurement used to control the drying process.

Dewatered sludge cake may be fed directly from a dewatering arrangement such for example comprising a belt press arrangement.

The belt press arrangement may comprise primary and secondary high pressure belt press arrangements.

The output from the infra-red moisture measuring transducer may be used to control sludge cake throughout via adjustment of the operation of the belt process arrangement.

The process may be controlled by a microprocessor.

Feedback loops may be used to control operational parameters (such as feed rates, alkaline admixture mixing ratios and polyelectrolyte dosing). The feedback loops may comprise proportional integral differential loops.

The steps of mixing, filing, drying and discharging the product may be performed within 24 hours. The step of filling comprises filling a pasteurisation unit, such as a FIFO hopper. The mixing and filling may be performed in less than 8 hours, drying in less than 5 hours and discharging in less than 3 hours.

Processes in accordance with the invention will now be described with reference to the accompanying drawings, in which.

Figure 1:
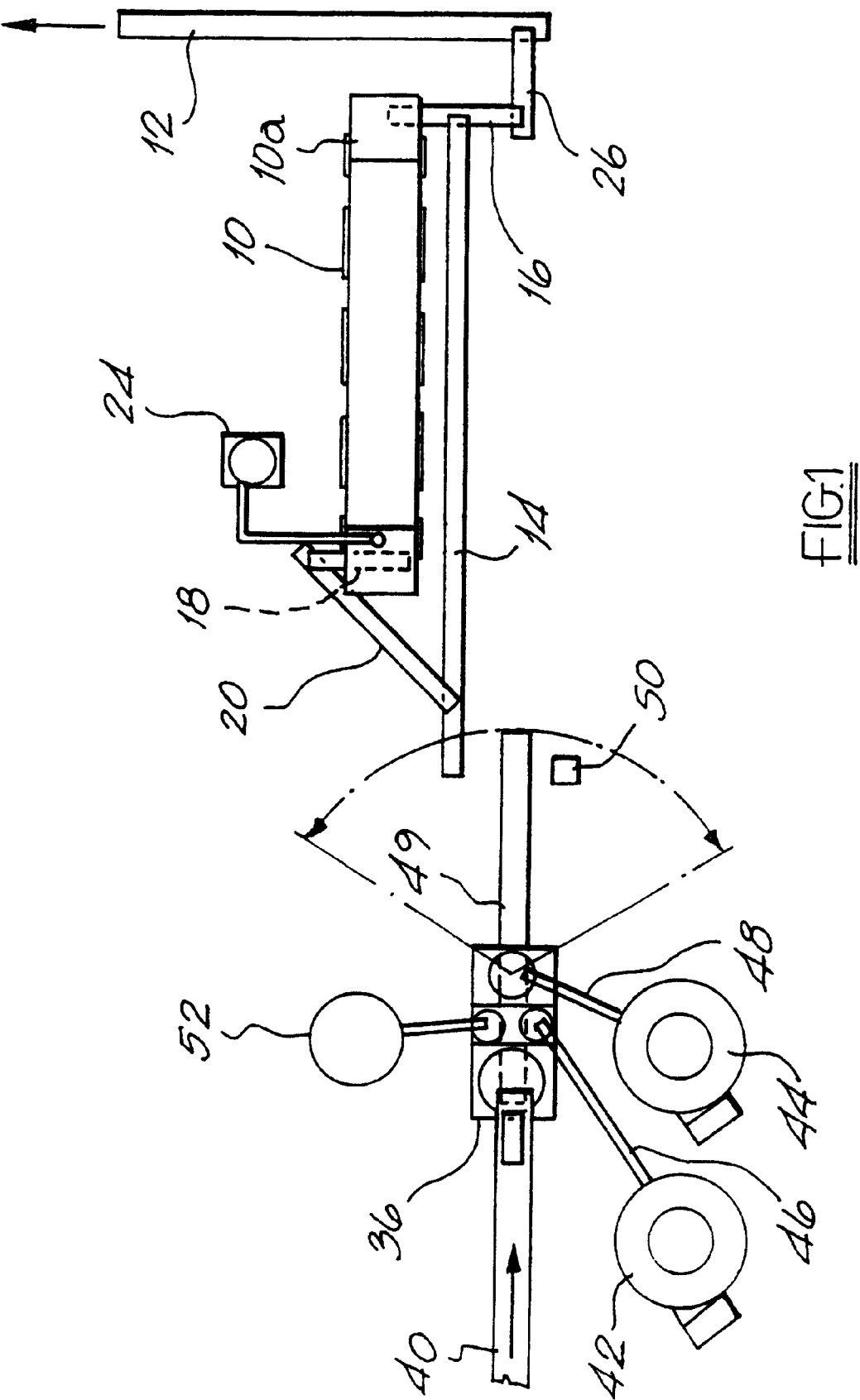
FIG. 1 is a plan view of a sludge cake-alkali mixing apparatus.
Figure 2:
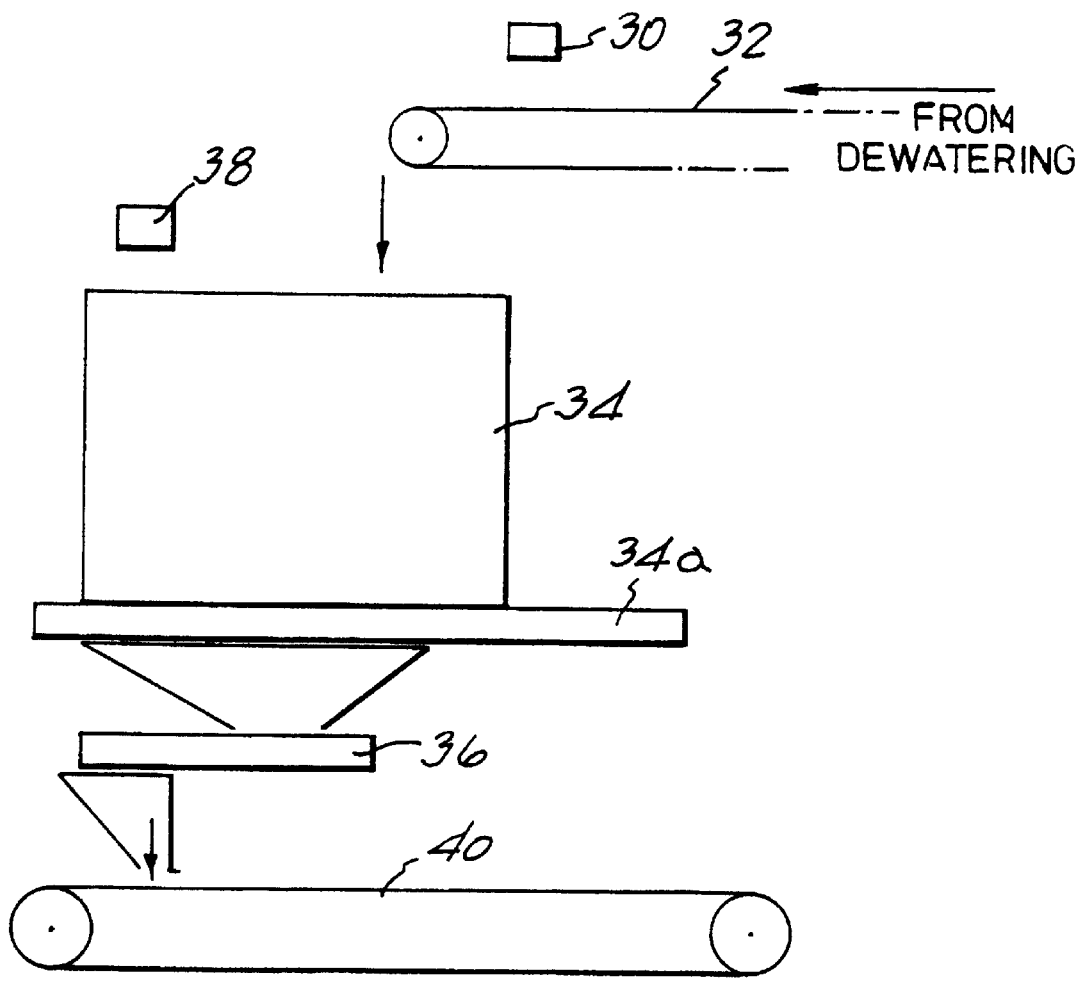
FIG. 2 is a schematic diagram of apparatus for introducing sludge cake to the mixing apparatus.

The invention comprises a process for treating sewage sludge and similar organic sludge in which dewatered sludge cake and an alkaline admixture are mixed and then dried under pasteurisation conditions utilising heat from the exothermic reaction with the alkali, in which drying is effected by extraction of moisture evaporated from the mixture by the exothermic heat. Apparatus for performing the process are depicted in FIGS. 1 and 2.

Pasteurisation and drying, by aeration, is effected in a first in first out (FIFO) hopper 10 such as a 100% live capacity Samson hopper fitted with full width discharger 10a.

The drying is effected in a cycling operation until a predetermined moisture content is detected, then the dried material is discharged via outloading belt conveyor 12, and take away belt conveyor 26.

The drying is effected to dry the product to between 50 and 65%, preferably between 55 and 60%, dry solids content. The drying product passes two or more times through the drying hopper 10, carried by an inclined belt conveyor 14, reversing belt conveyor 16, screw feeder discharger 18 and recycling belt conveyor 20. Drying is assisted by an air flow which may be fan generated by an extraction fan (not shown). The air flow is distributed across the cross section and length of the hopper 10.

Gases given off during drying are passed through an ammonia scrubber 24. Thus discharges to atmosphere are treated, and do not present a health risk either to the process operators or to the general public. Residual material from the ammonia scrubber 24 may be mixed with the final dried product to eliminate a waste stream and to enhance the nutrient value of the final product.

The product is held for a minimum of 12 hours at pasteurisation temperature, which is monitored by temperature probes (not shown).

The dried material is tested for moisture (or dry solids content) by a sensor (not shown), the output of which determines whether the product is recycled or delivered to another location, e.g. a stockpile, via the reversing belt conveyor 16 and take away belt conveyor 26. The dried material may be tested by an infra-red moisture measuring transducer. The process achieves total exhaustion of free calcium oxide with the water in the drying product. Additionally, when the product is ready to be discharged, a reduction in temperature to around 25° C. is achieved.

FIG. 2 depicts apparatus used at earlier stages of the process. At the beginning of the process, the dewatered sludge is measured for water content and the measurement used to control the alkaline admixture. This is achieved by passing the dewatered sludge beneath an infra-red moisture measuring transducer 30, and subsequently controlling certain operations in a manner described more fully below.

The dewatered sludge cake is fed—via a belt conveyor 32—to a storage bin 34 from where it is delivered to a mixing arrangement 36 with the alkaline admixture. The storage bin 34 has an ultrasonic level sensor 38 controlling the supply of sludge cake to the storage bin 34 and/or delivery of sludge cake to the mixing arrangement 36. The delivery of sludge cake to the mixing arrangement 36 is measured and the measurement used to control the supply of alkaline admixture to the mixing arrangement 36. Delivery of sludge cake (exiting the storage bin 34 via a sliding frame discharger 34a and screw feeder 34b) to the mixing arrangement is effected by a weigh belt feeder 40, which permits the measurement of sludge cake delivery by monitoring the weight of sludge cake fed.

The mixing arrangement 36 provides complete and intimate contact between the sludge cake and the alkaline admixtures without breaking the structure of the sludge cake (which would result in a "plasticised", paste-like material). Alkaline admixture is supplied from two silos 42, 44 via screw conveyors 46, 48. Further silos may be employed. Additionally, a lime silo 52 is provided. The purpose of the lime silo 52 is to provide small, controlled additions of CaO or a material having a high free CaO content (for example, lime kiln dust) in the event that the other alkaline admixtures do not achieve the required temperature rise and hold criteria. The mixed dewatered sludge cake and alkaline admixture is transferred via a swivel belt conveyor 49 to the inclined belt conveyor 14 which supplies the hopper 10. The moisture content of the mixed sludge cake and alkaline admixture is measured before drying and the measurement used to control the drying process. The measurement is made by an infra-red moisture measuring transducer 50, the output of which may also be used to adjust the feed rates of the alkaline admixture. This is used to achieve the desired mixed product moisture setting, typically 50%.

The dewatered sludge cake may be fed directly from a dewatering arrangement, which comprises a belt press arrangement (not shown). The belt press arrangement involves both primary and secondary belt pressing operations. Such an arrangement results in a number of advantages, such as an increase in dry solids content from a norm of ca. 25% to a norm of ca. 33 to 38%. Furthermore, substantial reductions in sludge cake tonnage feed, alkaline admixture, mixed product and overall plant size are found to occur.

The process is controlled by an industrial process controller (PLC) with PC based data acquisition. The PLC provides automatic control of material handling, mixing, and the pasteurisation/aeration process. The control and automation system incorporates proportional integral differential (PID) feedback loop controls to optimise process economy (e.g. admixture consumption and polyelectrolyte useage during dewatering) within the constraints of the required operating parameters. The use of other feedback systems is within the scope of the invention. Inputs from the moisture sensors and tachometers fitted to the feed screws (which provide indications of speeds and thus feed rates) are used in the control loops, although the master control is provided by the weight indication given by the weigh belt feeder 40. Variables such as polyelectrolyte dosing, and belt process speed and throughput are also under microprocessor control. The output from infra-red moisture measuring transducer 30 may be used to control sludge cake throughput via adjustment of the operation of belt press arrangement, in particular to optimise dry solids output with respect to polyelectrolyte additions.

The system software provides both visual and hard copy on line, reporting on all of the process steps described above. Daily production reports, heat pulse temperature graphs, and sludge, mixed and final product dry solids reports can be made available. Additionally, a "help line" service from the operating site to Head Office is provided via a modem link, with a remote management reporting facility.

It is possible to provide essentially continuous treatment by careful control of treatment times and operating conditions. With a single pasteurisation unit (such as the FIFO hopper 10) it is desirable to complete the entire process of mixing and filling, temperature rise and hold, recycling (comprising aeration and drying) and discharge within a 24 hour cycle. The major difficulty is that the pasteurisation temperature (typically 52 to 60° C.) should be maintained for at least 12 hours, with another two hours or so additionally being required to attain this temperature.

The key process considerations required to achieve the 24 hour cycle are:

(a) Mixing and filling operations must be rapid. This involves such considerations as increased dewatering machine capacities and operating regimes, sludge buffer storage capacity increase and resultant mixing machine throughput requirement.

(b) The recycle aeration and drying phase must be also rapid and efficient as perhaps only one complete recycle can be achieved. Special considerations during this phase are product discharge and recycle rates and ventilation requirements.

(c) Finished product discharge to stockpile must also be at a high rate.

In order also to achieve (a), (b) and (c) above, total variable speed control of the dewatering machines, mixer drivers and the mass discharger is required. Such is provided using the PLC system described above.

Using a single pasteurisation unit, a 24 hour cycle can be achieved on the following time scales, starting from t=0 hours

| | |
|---|---|
| dewatering (at 3.75 dry tonnes/hr) | 0 hours to 12 hours |
| mixing and filling pasteuriser (at 27.5 m³/hr) | 6 hours to 13 hours |
| heat pulse | 13 hours to 28 hours |
| recycling (at 50 m³/hr) | 24 hours to 28 hours |
| discharge (at 100 m³/hr) | 28 hours to 30 hours |

Then, from mixing and filling to discharge, the process requires 24 hours. In this way, it is possible to process 45 dry tonnes of sludge solids (129 tonnes of dewatered sludge cake feedstock at 35% dry solids) per day using equipment of the type described herein.

Figure 3A:
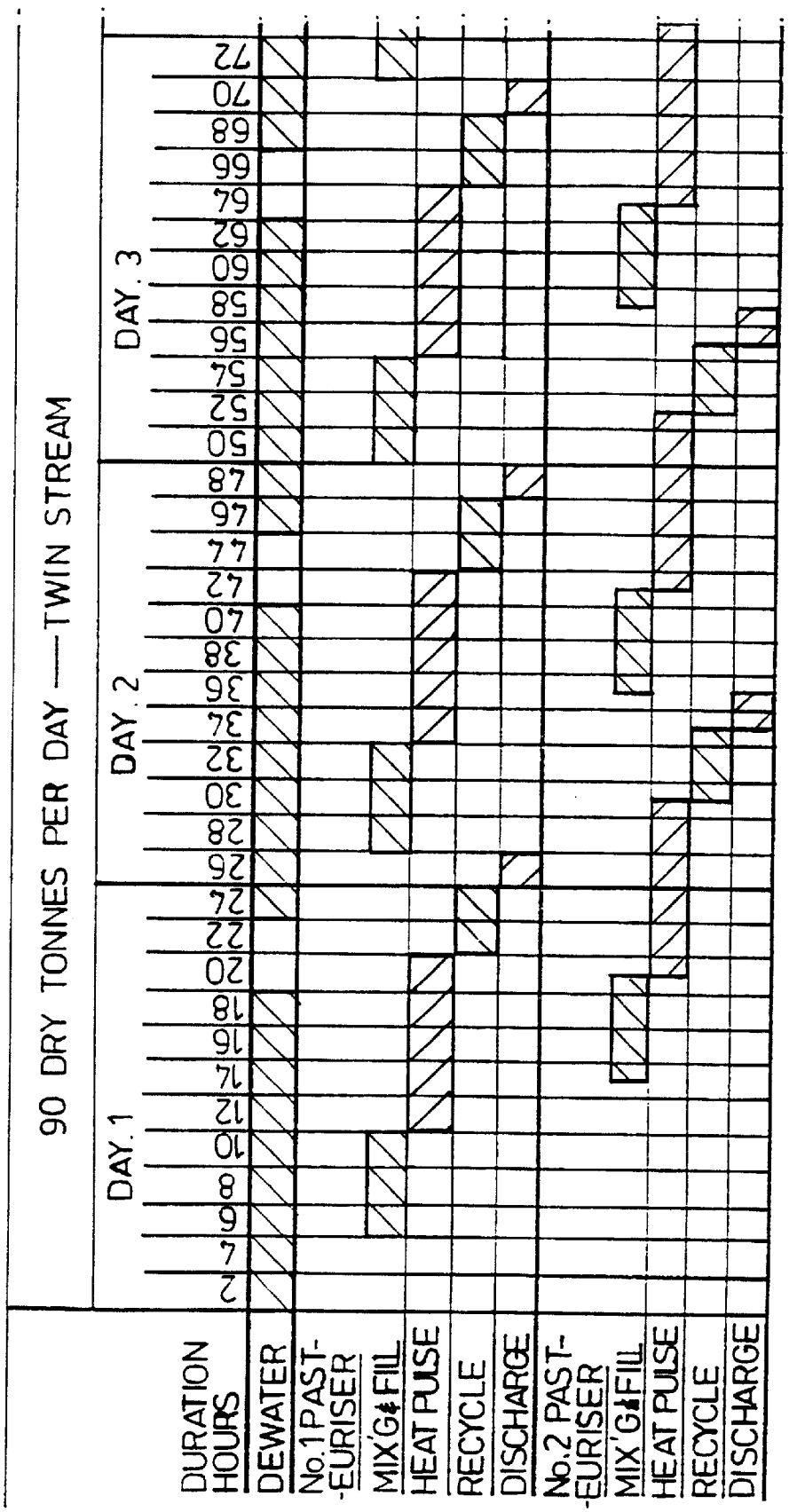
FIG. 3 shows an operational sequence for continuous treatment using a two hopper system.
Figure 3B:
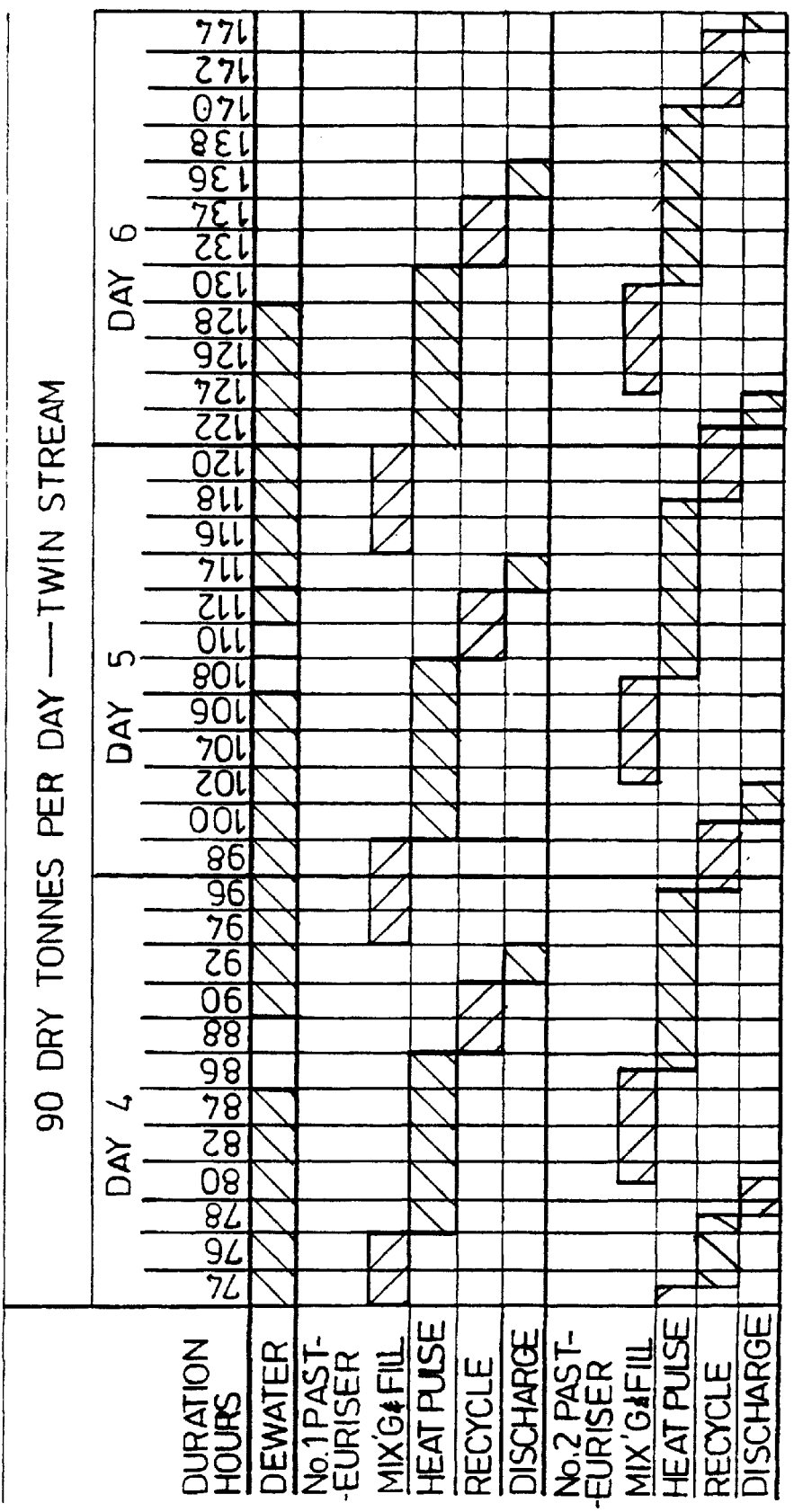

If a twin pasteuriser arrangement is employed, the above described operational cycle can be employed whilst enjoying 100% back-up capacity. In such an arrangement, an extra hopper might be provided to the set-up shown in FIG. 1, swivel belt 49 alternating between the two hoppers. Alternatively, both pasteurisers can be used in tandem. FIG. 3 shows an operational cycle for two pasteurises (No. 1 and No. 2). A throughput of 90 dry tonnes of sludge solids is possible using a dual pasteuriser in this way.

The advantages of the continuous treatment include reduced plant requirements, a reduced plant footprint, increased processing throughput and reduced operating labour and power costs per tonne of sludge processed, since most of the plant operations are carried out when the site is unmanned.

Modifications to the process described above will be apparent to those skilled in the art. For example, more admixture silos or an extra hopper for pasteurisation/drying might be provided.

What is claimed is:

1. A process for treating sludge in which dewatered sludge cake and an alkaline admixture are mixed and then dried under pasteurisation conditions utilising heat from an exothermic reaction with the alkali, in which drying is effected by extraction of moisture evaporated from the mixture by the exothermic heat generated by the exothermic reaction, and in which the dewatered sludge cake is measured for water content and the measurement is used to control the alkaline admixture.

2. A process according to claim 1, in which the drying is effected in a FIFO hopper.

3. A process according to claim 1, in which drying is effected in a cycling operation until a predetermined moisture content is detected, then the dried material is discharged.

4. A process according to claim 1, in which the drying is effected to dry the product to between 50 and 65% dry solids content.

5. A process according to claim 4, in which the drying is effected to dry the product to between 55 and 60% dry solids content.

6. A process according to claim 1, in which drying product passes more than once through a drying hopper.

7. A process according to claim 1, in which drying is assisted by an air flow.

8. A process according to claim 7, in which the air flow is fan generated.

9. A process according to claim 1, in which gases given off during drying are passed through an ammonia scrubber.

10. A process according to claims 1, in which the dried material is tested for moisture by a sensor having an output, the output of which determines whether the dried material is recycled or discharged.

11. A process according to claim 10, in which the dried mixture is tested by an infra-red moisture measuring transducer.

12. A process according to claim 1, in which the dewatered sludge passes beneath an infra-red moisture measuring transducer.

13. A process according to claim 1, in which the dewatered sludge cake is fed to a storage bin from where the dewatered sludge cake is delivered to a mixing arrangement; alkaline admixture is delivered to the mixing arrangement; and the mixing arrangement mixes the alkaline admixture with the dewatered sludge cake.

14. A process according to claim 13, in which the storage bin has a level sensor controlling the supply of sludge cake to the storage bin.

15. A process according to claim 13, in which delivery of sludge cake to the mixing arrangement is measured and the measurement used to control the supply of alkaline admixture to the mixing arrangement.

16. A process according to claim 15, in which delivery of sludge cake to the mixing arrangement is effected by a weigh belt.

17. A process according to claim 13, in which the storage bin has a level sensor controlling delivery of sludge cake to the mixing arrangement.

18. A process according to claims 1 in which the moisture content of the mixed dewatered sludge cake and alkaline admixture is measured and the measurement used to control the addition of said admixture to said sludge cake.

19. A process according to any one of claim 1, in which a moisture content of the mixed dewatered sludge cake and alkaline admixture is measured before drying and the measurement used to control the drying.

20. A process according to claim 1, in which dewatered sludge cake is fed directly from a dewatering arrangement.

21. A process according to claim 20, in which the dewatering arrangement comprises a belt press arrangement.

22. A process according to claim 21 in which the belt press arrangement comprises primary and secondary pressure belt press arrangements.

23. A process according to claim 1, in which the dewatered sludge cake is measured for water content and the measure used to control the alkine admixture, in which the dewatered sludge passes beneath an infra-red moisture measuring transducer, in which the dewatering arrangement comprises a belt press arrangement, in which the output from the infra-red moisture measuring transducer is used to control sludge cake throughput via adjustment of the operation of the belt press arrangement.

24. A process according to claim 1 controlled by a microprocessor.

25. A process according to claim 1 in which feedback loops are used to control operational parameters.

26. A process according to claim 25 in which the feedback loops comprise proportional integral differential loops.

27. A process according to claim 1, in which steps of mixing, filling, drying and discharging the product are performed within 24 hours.

28. A process according to claim 27 in which the steps of mixing and filling are performed in less than 8 hours.

29. A process according to claim 27, in which the step of drying is performed in less than 5 hours.

30. A process according to claim 27, in which the step of discharging is performed in less than 3 hours.

31. A process according to claim 27, in which the steps of mixing and filling are performed in less than eight hours, and the step of drying is performed in less than five hours.

32. A process according to claim 27, in which the steps of mixing and filling are performed in less than eight hours, and the step of discharging is performed in less than three hours.

33. A process according to claim 27, in which the step of drying is performed in less than five hours, and the step of discharging is performed in less than three hours.

34. A process according to claim 27, in which the steps of mixing and filling are performed in less than eight hours, the step of drying is performed in less than five hours, and the step of discharging is performed in less than three hours.

35. A process according to claim 1, in which the dewatered sludge cake is measured for water content and the measurement is used to control the alkaline admixture, in which the dewatered sludge passes beneath an infra-red moisture measuring transducer, in which the dewatering arrangement comprises a belt press arrangement, in which the belt press arrangement comprises primary and secondary pressure belt press arrangements, in which the output from the infra-red moisture measuring transducer is used to control sludge cake throughput via adjustment of the operation of the belt press arrangement.

* * * * *